United States Patent
Droz

(10) Patent No.: US 6,292,466 B1
(45) Date of Patent: Sep. 18, 2001

(54) CONNECTION ADMISSION CONTROL IN HIGH-SPEED PACKET SWITCHED NETWORKS

(75) Inventor: Patrick Droz, Glattbrugg (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/077,589
(22) PCT Filed: Dec. 13, 1995
(86) PCT No.: PCT/IB95/01122
§ 371 Date: Jun. 2, 1998
§ 102(e) Date: Jun. 2, 1998
(87) PCT Pub. No.: WO97/22224
PCT Pub. Date: Jun. 19, 1997

(51) Int. Cl.[7] ................................................ H04L 12/56
(52) U.S. Cl. .................................... 370/232; 370/395
(58) Field of Search ................................ 370/233, 230, 370/395, 425, 412, 429, 231, 232

(56) References Cited

U.S. PATENT DOCUMENTS 5,533,009 * 7/1996 Chen ........................................ 370/17
5,959,991 * 9/1999 Hatano .................................. 370/395
5,991,272 * 11/1999 Key ...................................... 370/252
6,031,820 * 2/2000 Kawasaki .............................. 370/230

* cited by examiner

Primary Examiner—Hassan Kizou
(74) Attorney, Agent, or Firm—Daniel E. McConnell

(57) ABSTRACT

In a high-speed packet switched communication system such as an ATM network, the number of existing connections is limited by a Connection Admission Control (CAC) procedure. For each newly requested connection, the expected traffic rate is added to an already reserved bandwidth and a test is made whether the sum is above a given limit.

According to the invention, the reserved bandwidth (r_bw) is updated not only for each new connection adding the additional requested capacity (RQ), but also in-between using an effective traffic capacity value derived from measuring the actual traffic (EC). For obtaining a reasonable effective traffic capacity value, the traffic sample sequence is modified by filtering out the "noise" representing short-time variations. This is done in an iterative procedure in which the cutoff between the signal and the "noise" portion is adaptively and dynamically changed so that the available buffer capacity can accommodate just that noise portion. For the filtering process, wavelet transformation is used.

13 Claims, 6 Drawing Sheets

CONNECTION ADMISSION CONTROL IN HIGH-SPEED PACKET SWITCHED NETWORKS

FIELD OF THE INVENTION

This invention relates to Connection Admission Control (CAC) in a high-speed packet switched network, and in particular to a CAC method which dynamically adapts to variations in the actual observed traffic.

BACKGROUND

Packet-switched networks are of increasing interest for the communication of computer data and a variety of other signals. In particular, it seems that Asynchronous Transfer Mode (ATM) networks will be widely employed in the future.

ATM is a packet-oriented switching and multiplexing technique for present and future broadband communication services having a wide spectrum of traffic statistics and Quality of Service (QoS) requirements. ATM offers high bit rates and higher flexibility than Synchronous Transfer Mode (STM). Through statistical multiplexing of many individual connections onto the same link. ATM networks achieve a higher utilization of the network. On the other hand, ATM networks demand more sophisticated connection admission control algorithms and congestion control methods in order to achieve the goal of a statistical multiplexing gain but still fulfilling QoS requirements.

Managing bandwidth in a network can be done in several different ways. In the following, a few approaches are presented.

(a) Peak Rate Allocation

For this method, the user specifies at connection setup only its peak rate. The network then reserves along the path on each link the requested peak bandwidth. The call is rejected if the sum of allocated bandwidths on one involved line exceeds its total capacity. The network reserves this peak rate independent of the user's actual traffic. The network monitors the peak rate of the user and polices its behavior. In case the user exceeds its negotiated peak rate, the network can take corrective actions. This method offers a high guarantee for quality of performance but it leads of course to a poor utilization of the network.

(b) Minimum Bandwidth Allocation

In this approach, the network user specifies the minimal required bandwidth that is needed for the connection. The network then reserves this amount of bandwidth on each link. A new connection is rejected if the total amount of allocated minimal bandwidth on a link would exceed the total link capacity. This method can lead to very high network utilization but a high quality of performance is not guaranteed, especially for sources with great variance in their traffic rates.

(c) Traffic Behavior Specification and Allocation

With this method, the user supplies a whole vector of parameters describing its behavior. In ATM, the vector includes peak cell rate, mean cell rate and maximum burst size. The networK then tries to calculate the needed network resources for the given parameter vector. The decision to accept or refuse a connection is difficult to make in order to achieve high network utilization. There is a trade-off between performance guarantee to the user and network utilization. The statistical multiplexing of several virtual channel connections onto the same link by reserving a bandwidth below the specified peak rate can lead to overbooking of links and therefore to congestion and cell losses. The transformation of the traffic descriptor vector into an amount of bandwidth is a key point to achieve a high network utilization.

The control functions for maintaining the required quality of service and for avoiding congestion in a high-speed packed switched network are either preventive or reactive. A preventive method is the Connection Admission Control (CAC) for new connections, reactive methods are bandwidth adaptation or transmission rate control for already existing connections (established virtual circuits).

In Connection Admission Control (also sometimes termed call admission control), a user has to make a request prior to establishment of a new connection. The respective network unit (such as a link access unit) then makes, based on the declared capacity or bandwidth which the new connection requires and on already existing bandwidth obligations, whether the new connection can be accepted. If not, the request is rejected; otherwise, sufficient bandwidth is allocated for the new connection which is then established.

Several descriptions of CAC methods are available in the prior art among which the following are of particular interest in connection with the present invention:

(a1) German Patent DE 4 134 476 (1993) entitled "Verfahren zur Steuerung der Zulassung von neuen Verbindungen bei asynchronen Zeitmultiplex-Paket-Vermittlungssystemen (Method of Admission Control for New Connections in Asynchronous Time Multiplex Packet Switching Systems)".

(a2) H. Kroener et al.: "Performance Modelling of an Adaptive CAC Strategy for ATM Networks", RACE Project 2068 LACE, 1993.

In these two publications, a method is disclosed in which a test is made whether the required bandwidth for a new connection, together with the already allocated bandwidth for existing connections, will exceed a predetermined utilization limit. This limit is dynamically adapted between given minimum and maximum values. The adaptation depends on actual network performance, in particular the fact whether cell losses occurred or not. The method is based on assumed traffic rates and not on the actual traffic situation, and it requires notification of actual cell losses which may cause an undue delay for making correct admission decisions for new connections.

(a3) U.S. Pat. No. 5,132,966 (1992) entitled "Call Control with Transmission Priority in a Packet Communication Network of an ATM Type". In the system disclosed in this patent, information sources are classified into at least two priorities. A specific bandwidth is assigned to each requesting source which is the specified peak rate for first priority sources and the specified average rate for second priority sources. A request is only accepted if the sum of the bandwidth currently assigned to all accepted sources plus the specific bandwidth of the new source does not exceed the transmission line capacity (predetermined capacity). In this system, the decision is always based on the accumulated sum of requested (reserved) capacities. This does not reflect the actual traffic situation and therefore may often lead to non-optimal utilization of the link.

(a4) H. Saito et al.: "Dynamic Call Admission Control in ATM Networks", IEEE Journal on SAC, Vol.9, No.7 (Sept. 1991), pp.982–989. In this control method, an estimate of cell loss probability is made when a new connection request arrives. The estimate is based on count values of arriving cells and on an estimated traffic characteristic of the new connection, based on parameters specified by the user. A new connection is only accepted if the estimated cell loss probability is below a predetermined value. The method is suited essentially for a single connection only, requires complicated calculations for the cell loss probability, and does not consider the influence of the ratio between fast and slow variations in the traffic rate.

The following publications describe reactive control methods for packet switched networks:

(b1) S.-Q. Li et al.: "Link Capacity Allocation and Network Control by Filtered Input Rate in High-Speed Networks", IEEE/ACM Trans. on Networking, Vol.3, No.1 (Feb.1993), pp. 10–25. The method disclosed in this paper concerns link capacity allocation for a finite buffer system. The allocated link capacity is adaptively changed using an on-line observation of the filtered input rate. The peak input rate for the link is filtered at a properly selected cut-off frequency and only the low-frequency component is considered for the capacity allocation. Though this method eliminates the higher frequency contents of the traffic behavior to achieve an improvement, it is not optimal because the cut off-frequency is fixed once it has been selected so that it does not reflect the possible variations in the distribution between fast and slow changes in the traffic rate.

(b2) U.S. Pat. No. 5,359,593 (1994) entitled "Dynamic Bandwidth Estimation and Adaptation for Packet Communications Networks". This patent discloses a technique for adaptively adjusting the bandwidth allocated to a source, by measuring the mean bit rate of signals from the source and filtering said mean bit rate measurements (and further by measuring and filtering loss probability), and changing the allocated bandwidth when the measured/filtered values are not within given limits. The filtering is done for determining the actual mean bit rate of the incoming traffic. Beside being specified only for a single source, this method does not consider adaptation to changing proportions between fast and slow traffic rate variations (changing signal/noise ratio) so that it may not be optimal for links serving a large number of sources.

OBJECT OF THE INVENTION

It is an object of present invention to devise a method for Connection Admission Control which is flexible and adaptive to varying traffic situations. More particularly, the object is a CAC method which can react immediately to new connection requests but adapts also very fast to variations in the traffic pattern. It is a further object to find a CAC method which can be easily implemented and executed on normal signal processing equipment.

SUMMARY OF THE INVENTION

The invention for achieving these objects is a method for Connection Admission Control in a high-speed packet switched network, in which a request for a new connection or for an expansion of bandwidth is accepted or rejected in dependence of the newly required transmission capacity and the already reserved transmission capacity. The invented method comprises the following steps: The actual traffic capacity is measured regularly to obtain traffic capacity samples; for a window of such samples, the higher frequency portion of a signal representing the sequence of samples is separated by an iterative and adaptive transform operation, such that this higher frequency portion does not exceed a given relation to available buffer capacity; from the remaining lower frequency portion which is obtained after a reverse transform operation, an effective traffic capacity value is determined; and this effective traffic capacity value is used as the basis for connection admission control procedures.

Preferably, the transformation operation for filtering the traffic sample sequence is a wavelet transformation. For the CAC procedure, a reserved bandwidth value is preferably maintained which is updated, using a declared rate value, whenever a new connection is established, but which is also updated whenever a new value of the effective traffic capacity is made available.

The main advantages of this novel CAC method are that it allows to optimize utilization of a link (or other resources involved), by adapting relatively fast to traffic variations which may be extreme, thus allowing to accept as many new connections or bandwidth requests as possible but on the other hand restricting connection admissions fast if necessary, to thus avoid degradation of quality. It also enables to adapt selectively to long-time traffic variations without reacting to various degrees of short-time variations in the traffic behavior. By appropriate selection of the transformation function used for the filtering process employed for obtaining the actual effective traffic capacity, it can be ideally adapted to specific traffic characteristics of a network. Further, the method is applicable to different forms of networks and aggregations of communication resources, and is particularly suited for ATM systems.

BRIEF DESCRIPTION OF THE DRAWINGS

A detailed description of a preferred embodiment of the invention is given in the sequel to allow a better understanding of its principles and advantages, in connection with the following drawings.

DETAILED DESCRIPTION

In the presented embodiment of the new CAC method, periodical frequency-domain analyses of traffic measurements on a link are made to obtain an effective traffic capacity value that is representative for the actual long-term traffic. A function representing the sequence of traffic measurement values is transformed into the frequency domain spectrum using an appropriate method, in particular wavelet transformation. The spectrum is then separated into a signal portion (low frequencies) and a noise portion (high frequencies). The threshold between low and high frequencies is chosen in an iterative adaptive process such that the noise can be absorbed in the link buffer. This means that the maximum of the cumulative sum of the high frequencies must only fill a given fraction the link buffer. From the remaining low frequency portion, the effective traffic capacity is then obtained as the maximum of the amplitude during the considered interval (the window).

Figure 1:
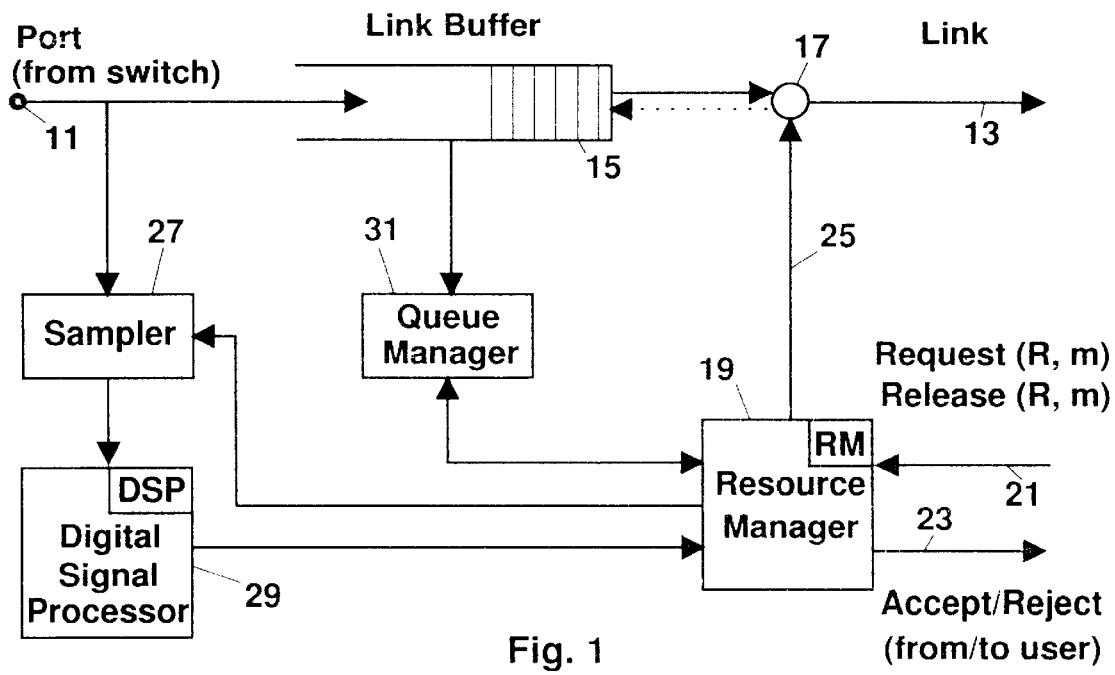
FIG. 1 is a block diagram of a link access unit in which present invention is employed.

FIG. 1 is a block diagram of a communication unit employing the invention. Input 11 is connected to one output of a switch which furnishes packets that are to be transmitted over a link 13 to the next node or switch of the system. It is assumed in this example that the system is an Asynchronous Transfer Mode (ATM) network so that the packets which are to be transmitted are ATM cells. The cells received at input port 11 are stored in a buffer 15 which is implemented as leaky bucket which transfers cells under control of output means 17 to the link.

As the link has a limited transmission capacity, any new connection or increase of bandwidth of an already existing connection has to be accepted or rejected by the Connection Admission Control (CAC) which is effected by the remaining portions of the unit shown in FIG. 1.

A resource manager (RM) receives requests for connection admission or bandwidth expansion from attached users on input 21, and in response to such request issues either an Accept or a Reject signal to the respective user on output 23. It can further send control information over connection 25 to output means 17 for adjusting the output rate (leak rate) of buffer 15. The requests from users to the resource manager include at least the values of expected peak traffic rate R and expected mean traffic rate m.

A sampler 27 does periodic traffic measurements by counting the cells transferred into buffer 15. The samples generated by sampler 27 consist of the cell counts divided by the period length $\Delta t$. (In an efficient implementation, the cell counts can be used directly because the division is a linear scaling which can also be applied afterwards.) The sampling frequency depends on the link speed and the buffer size. It is determined by the resource manager.

The sampler feeds its output to a digital signal processor (DSP) 29. In periodic intervals, the DSP analyzes the samples and calculates the effective traffic capacity which it sends to the resource manager RM. The resource manager triggers respective analyzing and calculation operations in the DSP. A queue manager (QM) 31 is provided which monitors the queue length in buffer 15. If the queue length exceeds a certain threshold or if even cell losses occur, it signals this fact to the resource manager.

Requests for termination of a connection or a decrease in bandwidth which are also sent from users to the resource manager (RELEASE, on input 21) and which also indicate the released peak and mean rates (R, m) are always granted. They are required however for adapting the current value of the reserved bandwidth (which will be explained later).

It should be noted that in connection with FIG. 1 only a simple and basic embodiment of the invention is described. For this case, it is assumed that there is only one instance of the connection access control of the present invention. In general, multiple instances that control groups or individual connections can be present. Some connections can be completely excluded from the method. For instance, tor a connection with a burst generation rate larger than the window size that is used for measurements and effective capacity calculation, simple peak rate allocation can be done. Furthermore, since the description is given for an ATM network, all the traffic parameters are given in cells per second. In case of variable size packets the method can still be used by expressing the parameters in bits per second.

Traffic and Bandwidth Values

Figure 2A:
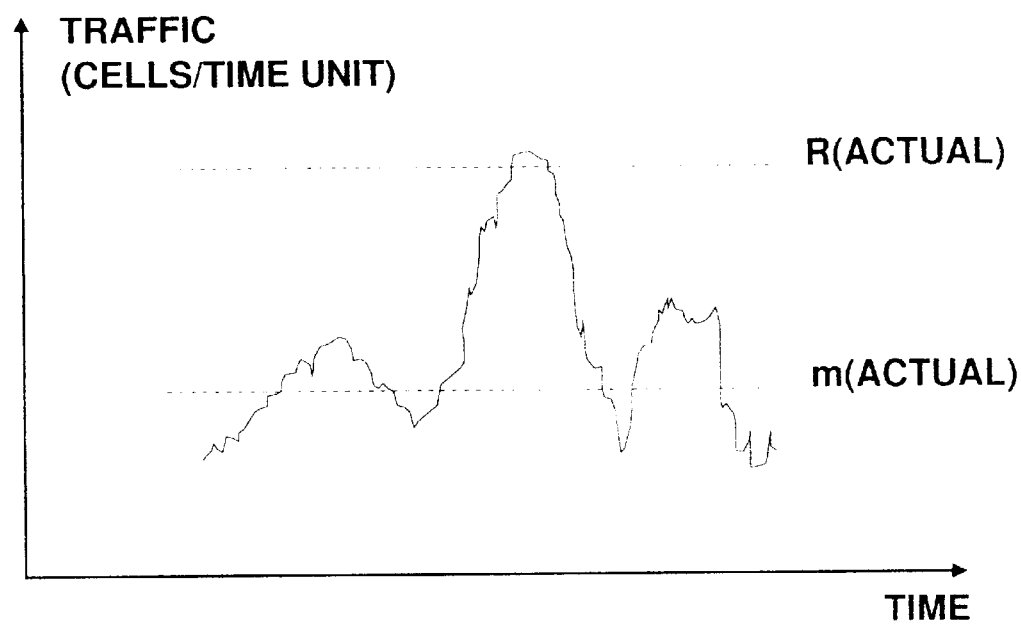
FIGS. 2A and 2B are diagrams showing the course of traffic rate values over time, and showing a curve of the reserved bandwidth on which, according to the invention, the Connection Admission Control is based, together with accumulated (aggregate) peak and mean rates based on user declarations. In particular, the figure illustrates the changes (adaptation) in reserved bandwidth due to new user requests as well as those due to new measurement values of actual traffic.
Figure 2B:
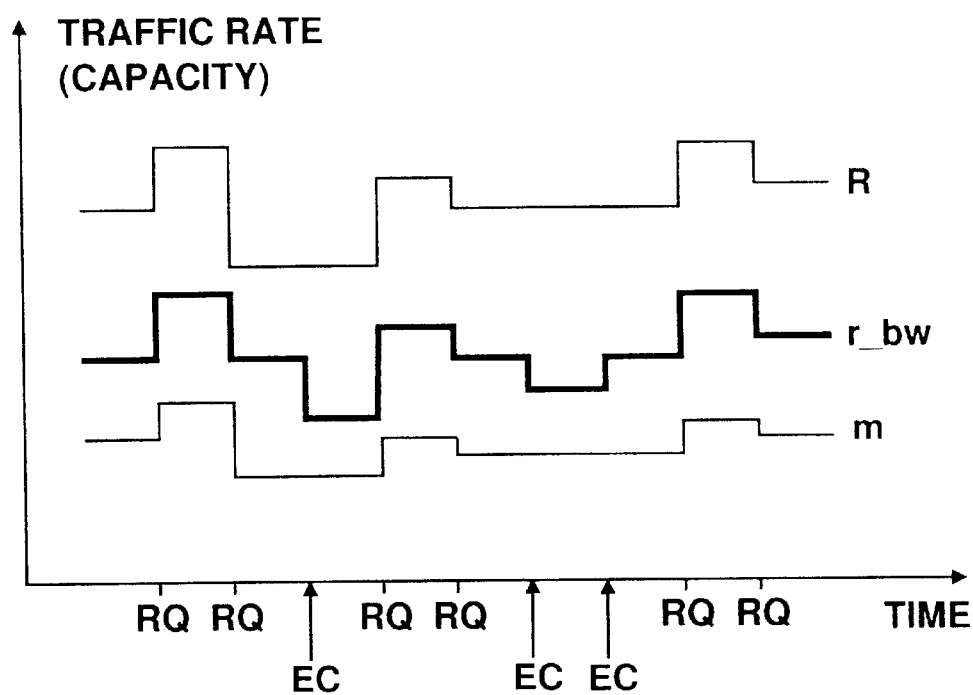

For a better understanding of some terms used in this description, FIGS. 2A and 2B are provided. The curve in FIG. 2A shows the course of the traffic rate (number of cells per time unit) over time. The curve can be considered as the sequence of measurement values which the sampler obtains when it counts the transmitted cells per chosen time increment. This curve shows that there are slow variations in the traffic capacity (low frequency contents of the curve) which are to be considered for access control and bandwidth reservation, and short-time variations (high frequency contents of the curve) which can be absorbed by the buffers. The average rate of the traffic, i.e. its mean value, is indicated by the dashed line m, and the peak value is indicated by R. FIG. 2B schematically shows that the reserved bandwidth (r_bw) is kept between the aggregate mean rate m and the aggregate peak rate R. It is adapted with each user request (at time RQ) for new bandwidth or release of granted bandwidth, and is also adapted whenever the calculation of a new, measurement-based effective traffic capacity value c is made (at time EC). The reserved bandwidth is always limited in the range between the total (aggregate) requested mean rate m and the total (aggregate) requested peak rate R (even if the measurement-based effective capacity value is outside of this range). Details will be shown later.

It should be noted that the calculation of a new effective capacity value (and thus an updating of the reserved bandwidth) can be either made at regular intervals (as shown later) or whenever considered necessary, e.g. when a service quality degradation (cell loss etc.) is notified from the queue manager QM to the resource manager RM. The latter procedure is assumed for FIG. 2B (irregular intervals for EC). A combination of both would also be possible.

Handling of Request for New Connection

The procedure for handling a request for a new connection (or for the request for a bandwidth increase) by the resource manager is now described in connection with the flow diagram of FIG. 3. At any point in time, there is a currently reserved bandwidth r_bw, aggregate peak rate S_R (sum of all requested and accepted peak rates), and aggregate mean rate S_m (sum of all requested and accepted mean rates). For the link which has to transmit the traffic exists a link speed l_speed (maximum traffic that can be transmitted), and a link utilization factor l_util which is typically 0.8. This factor ensures that a safety margin of e.g. 20% of the link capacity remains.

Figure 3:
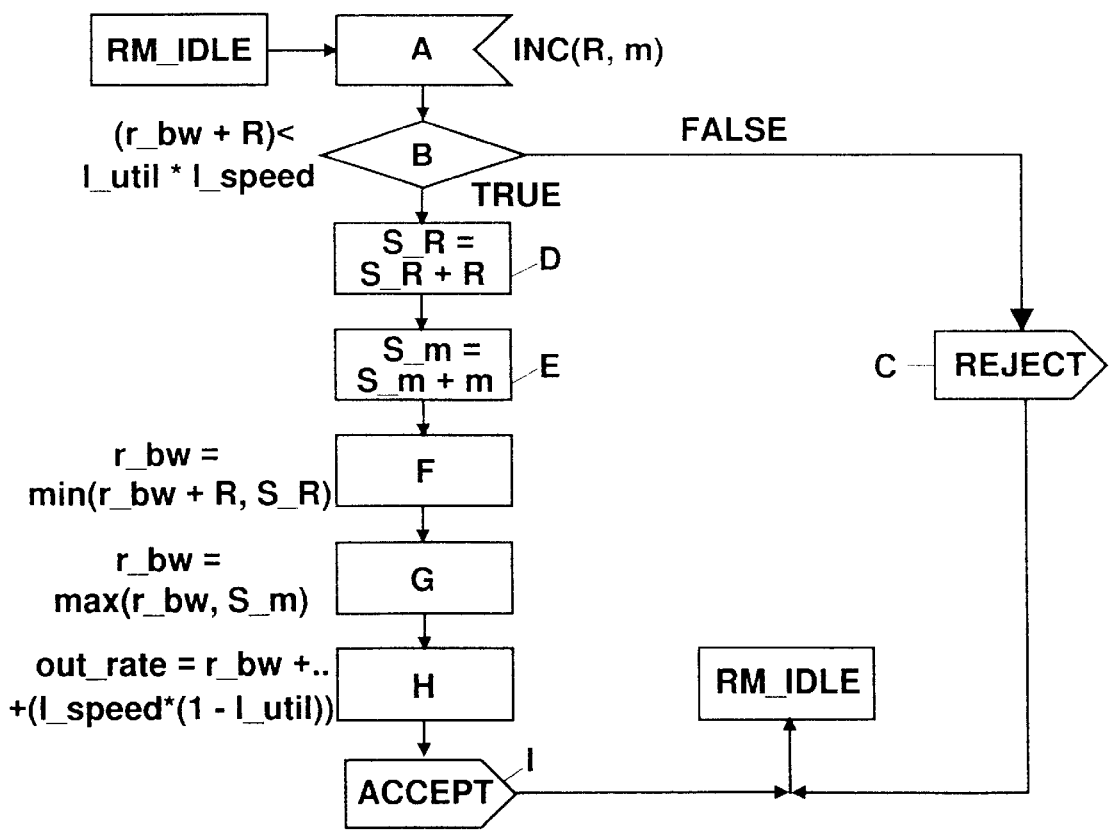
FIG. 3 is a flow diagram of the process steps (procedure) for determining whether a new connection can be accepted, and for the adaptation of the reserved bandwidth when a new connection is actually accepted.

When the idle resource manager RM receives a request, A in FIG. 3, including the values for expected peak value R and mean value m of the traffic rate for the new connection, it first checks B, in FIG. 3, whether the sum of the currently reserved bandwidth r_bw and the new peak rate does not exceed the link speed times link utilization factor. If the sum is too large, the new request is immediately rejected, C in FIG. 3. Otherwise, the acceptance procedure is effected. The aggregate peak value S_R and mean value S_m are increased by the respective values R and m of the new request, D and E in FIG. 3. Then, the reserved bandwidth is adapted. First, the peak rate R is added to the old reserved bandwidth to obtain a provisional new value for r_bw which is then bounded between the new aggregate peak rate S_R and the new aggregate mean rate S_m, F and G in FIG. 3. The result then is the actually new reserved bandwidth r_bw.

The reason for bounding the reserved bandwidth between total (aggregate) mean and peak rates (S_m and S_R) is because these values are the theoretical boundaries. If the traffic goes over the total peak rate there is something wrong with the policing of the peak rate. In case the traffic is permanently below the total mean rate the sources did not specify themselves well. This kind of false description (self-specification) should be detected and corrected at the access to the network (and is not part of the method of the invention).

When the new reserved bandwidth is fixed, the output rate for the buffer 15 is adapted, H in FIG. 3, to a value which is equal to the sum of this new r_bw plus the link reserve mentioned above which is l_speed*(1-l_util). This new output rate is signalled to output means 17. Finally, an acceptance signal is furnished through output 23 to the requesting user I in FIG. 3. The resource manager is then available for the next operation.

Essentially the same procedure is executed when a connection is terminated (or a bandwidth decrease is requested). The only differences are that no acceptance or rejection is signalled (because termination/decrease is always accepted), and the new aggregate peak and mean rates are established by subtracting R and m from the previous aggregate rates S_R and S_m. The new reserved bandwidth is then also obtained by subtracting R from the old r_bw and bounding it between the new aggregate mean and peak rates.

Adaptation of Reserved Bandwidth to Effective Capacity

An important feature of the presented Connection Admission Control method is the fact that the reserved bandwidth is not only based on the input values R and m of the requesting users (as described so far) but that regular measurements of the actual traffic rates (cell rates) are made, that the high-frequency contents of the resulting curve are eliminated in an iterative, adaptive process, and that on the basis of the lower frequency contents of this curve of traffic rates an effective traffic capacity is calculated at regular intervals. The reserved bandwidth is adapted on the basis of each new effective capacity value.

Elimination of the higher frequency contents of the traffic measurement values with the aid of wavelet transformation, and computation of effective capacity values will be explained in a later section. In the following, adaptation of the reserved bandwidth is described with reference to FIG. 4.

Beside obtaining a new effective capacity value at regular intervals (described later) or when considered necessary (as mentioned above), the resource manager also stores the actual aggregate peak rate value S_R at regular intervals as value "save_S_R". When a new reserved bandwidth is to be calculated, a recent change in the aggregate peak rate S_R can then also be considered. This is done because the effect of a recently added new connection may not yet be appropriately reflected in the window of measurement samples on which the calculation of c is based.

Figure 4:
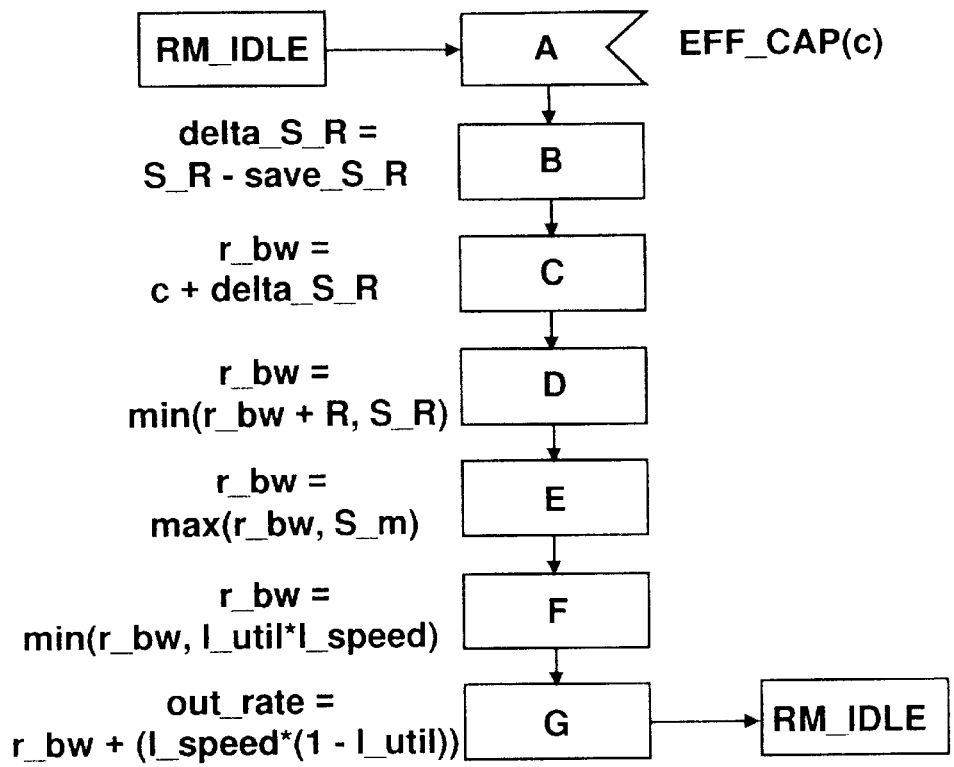
FIG. 4 is a flow diagram illustrating the process steps for adapting the reserved bandwidth when a new value for the effective (actual) traffic capacity becomes available as a result of actual traffic measurements.

The procedure is shown in the flow diagram of FIG. 4. When a new effective capacity value "c" becomes available, A in FIG. 4, the difference between the stored old aggregate peak value old_S_R and the then actual aggregate peak value S_R is obtained (B in FIG. 4). A provisional new reserved bandwidth r_bw is then determined as the sum of the actual effective capacity c and the obtained difference delta_S_R between peak values (C in FIG. 4). The reserved bandwidth is then bound between the aggregate peak cell rate and aggregate mean cell rate but at most to the link speed multiplied by the link utilization (D, E, and F in FIG. 4). Finally, the buffer output rate is set to the newly determined reserved bandwidth plus the link reserve (G in FIG. 4).

To summarize, the resource manager RM maintains a current value of reserved bandwidth r_bw which it dynamically adapts. An adaptation is made: (a) on the basis of user estimates (traffic rate specifications), each time a user requests new bandwidth or releases bandwidth; and (b) on the basis of actual traffic measurements from which an effective traffic capacity is calculated at regular intervals. The admission of a new connection (or a bandwidth increase) is always based on the current value of the reserved bandwidth r_bw.

Timing of Calculations

In the resource manager, two timers periodically generate timeouts. The first triggers the saving of the currently allocated total (aggregate) peak rate S_R as "save_S_R". The second timer is to trigger a new calculation of the effective traffic capacity "c".

Figure 5:
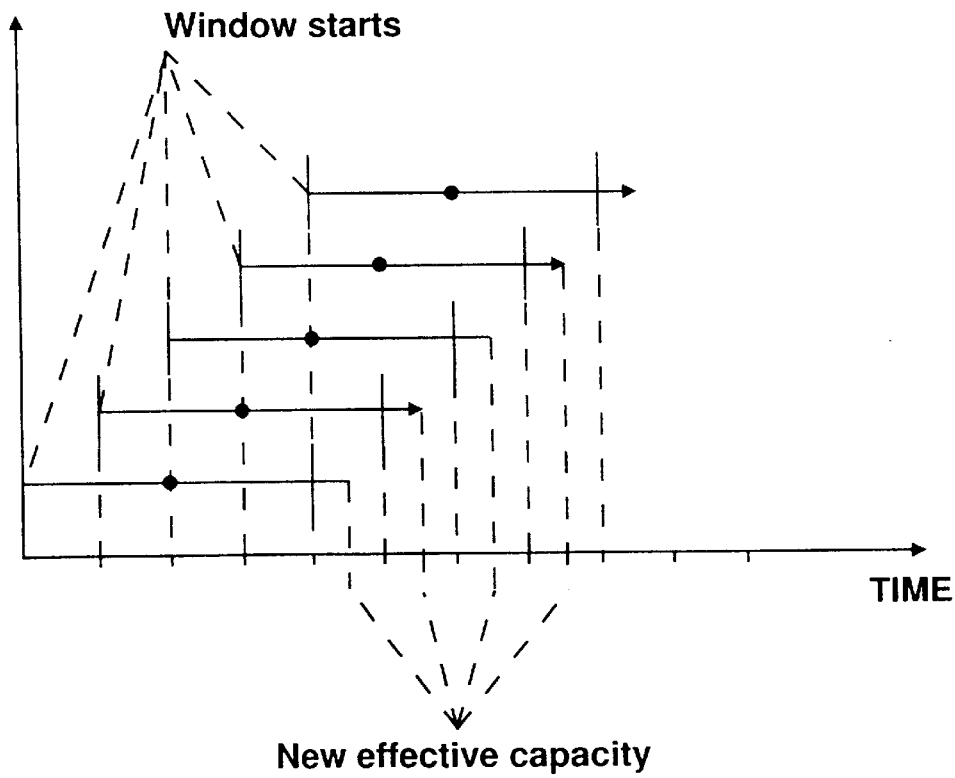
FIG. 5 illustrates overlapping sampling windows of traffic samples for calculating sequential values of the effective traffic capacity.

The effective capacity is calculated on partial overlapping windows, cf. FIG. 5. The overlap is needed to capture trends across the borders as well. Two more things can be seen from FIG. 5.

First, the black dots represent the points in time where the currently allocated peak rate is stored as "save_S_R". In the given example the middle of the window has been chosen. From such a point on until a newly calculated value "c" of the effective capacity becomes available, peak rate allocation is done for new connections or bandwidth increases. This is to cope with increases that arrive towards the end of the window and which can only be observed in a short period. The closer this freezing point is moved towards the beginning of the window the more pessimistic the algorithm is (longer observation phase).

The second point is the time delay (the little arrows) until the result of a new calculation becomes available. This delay is also the limit for the triggering of new calculations.

A reasonable window size is between one and several seconds. The larger the window is chosen the more observations from the past influence the future.

Wavelet Transformation

For the frequency analysis to be made in the present invention when the effective traffic capacity is calculated, wavelet transformation is the most appropriate tool, though other forms of transformation could also be applied. However, as it is actually only used as a tool, no detailed description will be given here. Good introductions and theoretical background can be found in the following publications:

Amara Graps: An Introduction to Wavelets. IEEE Computational Science and Engineering, Vol.2, No.2, Summer 1995. IEEE Computer Society, Los Alamos.

Charles K. Chui: An Introduction to Wavelets. Wavelet Analysis and its Applications, Vol.1. Academic Press, Boston 1992.

Stephane G. Malat: A Theory for Multiresolution Signal Decomposition: The Wavelet Representation. IEEE Transactions on Pattern Analysis and Machine Intelligence, Vol.11, No.2, July 1989, pp.674–693.

A brief explanation of wavelet transformation is given in the following to help understanding of the described embodiment of the invention which uses wavelet analysis and synthesis.

Wavelet analysis can be compared to Fourier analysis. It transforms a signal from the time domain into the frequency domain. In case of a Fourier analysis, one is either in the time domain or in the frequency domain but there is no relationship between the two domains. This means that in the frequency domain it can be seen which frequencies appeared and how strong they are represented but it is not possible to see where (in the time domain) they appeared. To cope with this problem, a windowed Fourier analysis can be used where the input signal is split into different windows which are then analyzed individually. The difficulty of this approach is how the window borders have to be handled. The wavelet analysis solves this problem by looking at the input signal at different scales or resolutions. On a large scale, the focus is on gross features i.e. trends, while on a small scale minor features (e.g. the noise) are of interest.

The general idea is to adopt a wavelet prototype function, called an "analyzing wavelet" or a "mother wavelet". These functions are bases in the function space. Compared to a Fourier transformation, where only one basis consisting of sines and cosines of different frequencies exist, one has the choice of numerous bases. This allows to find the best basis for a particular input data set.

Temporal analysis is carried out with a contracted high-frequency version of the mother wavelet. The frequency analysis is done with a dilated low-frequency version of the prototype wavelet.

Figure 6:
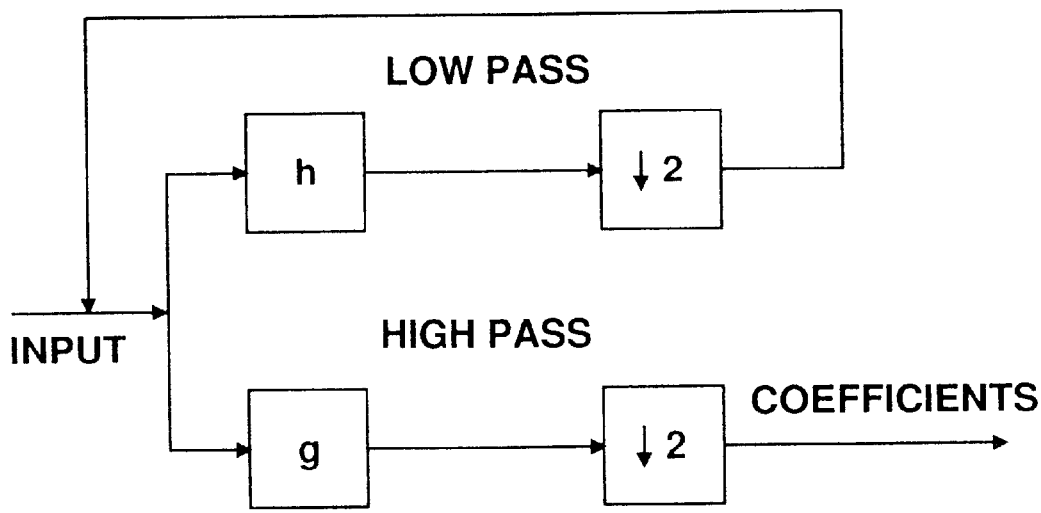
FIG. 6 is a block diagram of the wavelet transformation process used in the embodiment of the invention.

Similar to the Fast Fourier Transformation (FFT) exists a Fast Wavelet Transformation (FWT). Instead of FWT it is sometimes called Discrete Wavelet Transformation (DWT). The FFT has a complexity O(n log 2) while the FWT can be calculated in O(n). For both transformations, the input length is expected to be a power of 2. In FIG. 6, a block diagram of the procedure is given. "g" and "h" designate the specific selected wavelet filter functions. The $\downarrow 2$ stands for a down-sampling of 2. This is achieved by dropping every second sample of the input. The high-pass filtered output on each scale is kept as the coefficients of that scale. The low-pass filtered and down-sampled output is fed back as input to the transformation process. This process is sometimes called "pyramid algorithm" because of the hierarchical processing. The loop is performed until no samples are left. On each scale the number of coefficients is reduced by a factor of 2. The total number of coefficients over all scales equals the number of input values. The low-pass filtering is to smooth the signal while the high-pass filtering is to reveal the details. In wavelet theory, the mother function for the low-pass filter is called the "scale function" and the mother function for the high-pass filter "wavelet function".

The most striking difference between Fourier and wavelet transformation is that the wavelet functions are localized in space and frequency. Sines and cosines do not have both of these properties. Because they are periodic, non-vanishing functions, they are only localized in frequency. This two-fold localization very often generates a sparse spectrum of coefficients, a property that is desired in many applications such as image compression or noise removal in time series.

Figure 7:
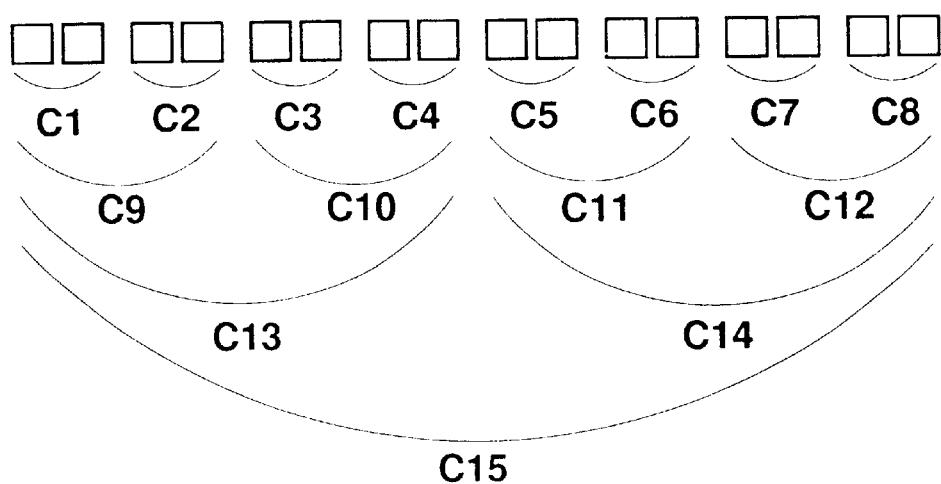
FIG. 7 illustrates the time localization in the frequency domain of a wavelet transformation.

To illustrate the two-fold localization, the following example with 16 samples is given (cf. FIG. 7). On the first scale, the coefficients $c_1$ to $c_8$ are generated. Then on the second scale, $c_9$ to $c_{12}$ are generated. The bracing in FIG. 7 indicates the localization for the calculated coefficient. The region is given through the down-sampling operation that contracts the data in each iteration by a factor of two. Unlike to the Fourier transformation, one sees to which part of the input data the coefficient belongs. In most implementations, the coefficients are put in one vector one scale after the other, the last coefficient being the final residual of the low-pass filtering. The total number of coefficients is then equivalent to the input sample size.

For the wavelet transformation, there are numerous possible bases already known. Wavelets are classified into several distinct families. Inside the family a further distinction is made according to the number of coefficients. For the wavelet analysis to be carried out when an effective capacity value is calculated according to this invention, a suitable basis is the Haar wavelet which is a special member of the Daubechies wavelet family. Suitable filters of this family would be e.g. filters of either length 2 or length 16. An important property of the Daubechies family is that the wavelet itself has a self-similar structure. This is of advantage when the curve representing the traffic rate values also has self-similar properties which can often occur in packet switched networks (bursts appear over a wide spectrum of time scales).

Computation of Effective Traffic Capacity

As was mentioned above already, the effective traffic capacity is computed (in the present example) at regular intervals, based on actual traffic measurements of the sampler. The respective algorithm is now explained with reference to the flow diagram of FIG. 8. It should be noted, however, that this algorithm is only one possible implementation; alternatives will be mentioned later.

The following parameters (variables) are used in the algorithm:

found
: binary control variable indicating whether the higher frequency portion separated from the traffic signal fulfills a given criterion. It is either FALSE (binary zero) or TRUE (binary one);

step
: a number indicating the step or scale which has been reached in the iterative algorithm;

nr_of_steps
: the total number of steps (scales) which can be made in one execution of the algorithm;

coeffs
: a set of coefficients which are obtained by wavelet transformation of a traffic signal. The set can be modified to extract a desired frequency portion of the signal (filtering).

X
: set or window of traffic rate values which are obtained by the sampler;

wt (. . .)
: indicates a wavelet transformation;

iwt (. . .)
: indicates the inverse of a wavelet transformation;

-continued high_f filtered higher frequency portion of a traffic signal;
low_f filtered lower frequency portion of a traffic signal;
modify (coeffs, step)

modification of the coefficients set by extracting (eliminating) a portion of the coefficients depending on the respective step number;
cumsum (. . .)

for a given window of measurement values, providing for each point (of time) the cumulated sum of all preceding values; the cumsum is also a curve (sequence) of values for the respective window;
max_dev the maximum (positive) value of the cumsum function in a given window;
c effective traffic capacity as determined by this algorithm.

Before explaining the algorithm in detail, a short general description is given here. The goal is to separate from the traffic signal the lower frequency portion for which bandwidth must be reserved, from the higher frequency portion which represents rapid short time variations in the traffic capacity that can be absorbed by the buffers.

In an iterative process, a varying higher frequency portion is separated from the traffic signal and a test is made whether that portion can be absorbed by the buffers. If yes, the portion is modified and another test is made and so on until the highest possible portion is found which can be absorbed. The remaining lower frequency portion of the traffic signal is then used for determining the effective traffic capacity.

Figure 8:
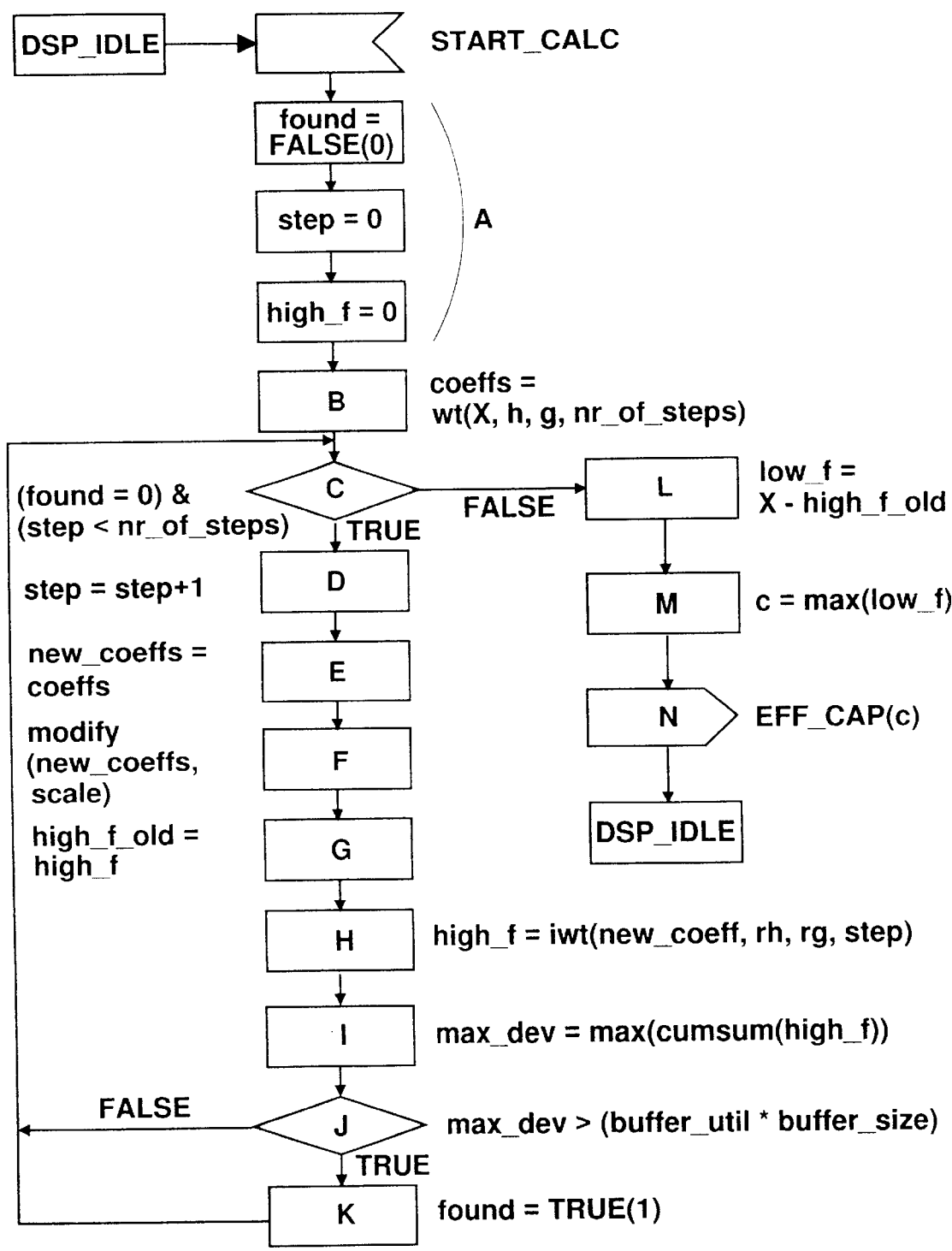
FIG. 8 is a flow diagram of the procedure for calculating a new value of the effective traffic capacity on the basis of a window of traffic samples (measurement values)

Referring to FIG. 8, the algorithm is started by a timer signal (START_CALC).

Then some variables are set to their initial values (A in FIG. 8): found=FALSE (binary zero), step=0, and high_f=0. Thereafter (B) a wavelet transformation is made to obtain a set of coefficients, with the following parameters: X is the current window of traffic samples from the sampler; h and g are the wavelet filter functions (as explained above); and the nr_of_steps which depends on the number of values contained in the window of traffic samples n=$2^{nr\_of\_steps}$, where n is the number of sample values).

Then a test is made (C in FIG. 8) whether the control variable is still FALSE and whether the current step number is yet below the total possible number (nr_of_steps). If both answers are positive (as is the case in the first iteration), the step number (initially zero) is increased by 1 (D). The set of coefficients is then stored as new_coeffs (E in FIG. 8) on which the following operations are made. Thereafter (F) the current set of coefficients (new_coeffs) is modified according to the current step number. By this operation, a portion of the coefficients is cancelled (e.g. one half of all coefficients are eliminated). This operation effects a filtering, i.e. the remaining coefficients represent only some higher frequency portion of the traffic signal. Some details will be explained in connection with FIG. 9.

In the next process step, the current high-frequency portion is stored as high_f_old (G in FIG. 8) so that it can be used later in the final branch of the algorithm. In the first iteration, both are still zero. Thereafter (H), an inverse wavelet transformation is made to obtain the higher frequency portion high_f that has been filtered out in the current iteration. Following parameters are used in this inverse transformation: the current modified set of coefficients new_coeff; the filter functions rh and rg for the inverse transformation; and the current step number. The filtered higher frequency portion is now available as a sequence of traffic rate values (a window) which are distributed around zero.

Then, the following operations are made (I in FIG. 8). A cumulated sum curve (cumsum) is computed by determining for each point of time in the window the sum of the respective and all previous traffic rate values. Each value in this curve represents the buffer filling (above or below a mean filling) which is due to the rapid variations in traffic capacity, i.e. due to the higher frequency portion. The highest (positive) value of this cumsum curve (i.e. the maximum filling of the buffers above the mean filling) is then detected as max_dev.

Then, a test is made (J in FIG. 8) whether this value is already above a value which is given as the product of the buffer capacity times a utilization factor. Such utilization factor depends of course on the particular network and the general nature of the traffic. A typical value would be 0.1. If the max_dev is still small enough to be absorbed by the buffers (output FALSE of test) then the higher frequency portion can be extended in the next iteration. If, however, the max_dev was too large (output TRUE of test), then the limit was reached, the control variable found is set to TRUE (binary one), and the previous higher frequency portion (high_f_old) of the traffic signal must be used for the effective capacity determination.

Returning to the first operation in the iteration loop (C in FIG. 8), when the respective test reveals that either the control variable is TRUE (limit reached), or that the final step had been made (which means that all coefficients have been eliminated and the total traffic signal is higher frequency which can be absorbed by the buffers), then a branch is made to the final operations of the iterative process. The values which were stored as high_f_old are subtracted from the values X representing the window of the total traffic signal, to obtain the set of values low_f which are the lower frequency portion that actually represents the longer-term traffic capacity (L in FIG. 8). Then, the maximum of this set of values is taken as the effective traffic capacity c (M). This value c is transferred to the resource manager RM (N in FIG. 8) and can then be used for a new calculation of the reserved bandwidth, as shown in FIG. 4.

Modification of Wavelet Transformation Coefficient Set

Figure 9:
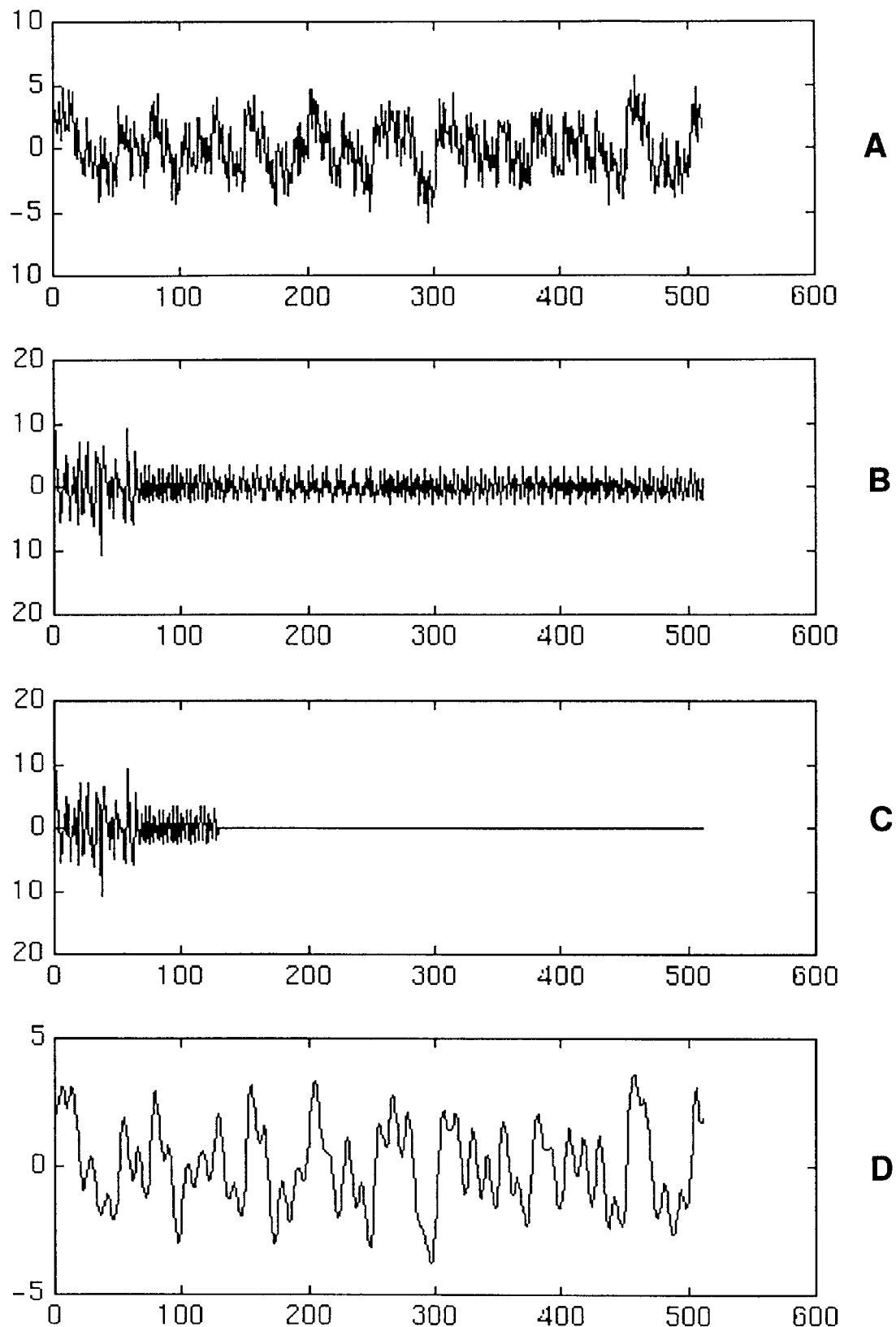
FIGS. 9A–9D illustrate for a traffic curve the filtering effect which is achieved by wavelet transformation and by modification of the resulting set of coefficients.

FIG. 9 illustrates the result of modifying the set of coefficients (the wavelet vector) for filtering out certain frequency components from a signal. The first curve, A in FIG. 9, shows the original signal. The second curve, B, is the result of the wavelet transformation, i.e. the set (vector) of coefficients obtained as output. For modification, a portion determined by the respective scale (step number of algorithm). e.g. the lower quarter of the set of coefficients, is maintained while the other portion, i.e. the upper three quarters in this example, are dropped (set to zero). The thus modified wavelet vector (i.e. the selected subset of coefficients) is shown as curve C in FIG. 9. By an inverse wavelet transformation process on this modified vector, one obtains a reconstructed signal, D in FIG. 9. The wavelet functions used for this example were Daubechies of size 16.

If the result of the modification, i.e. the reconstructed signal does not meet given conditions, then in a next step another modification can be made. Starting from the same wavelet vector, B in FIG. 9, another subset of coefficients would be selected, e.g. by eliminating one half of the coefficients and retaining the other half (result would be a different modified vector than that shown at C in FIG. 9). Thereafter, another reconstructed signal would be obtained by an inverse wavelet transformation, and again this can be subjected to the criterion test.

While in the example illustrated in FIG. 9 higher frequencies were eliminated by filtering, in the effective capacity calculation described above (flow diagram of FIG. 8), higher frequency components of the signal are extracted by modifying the coefficient vector. This is done by selecting coefficients from the upper portion (one half or one quarter, etc.).

Different strategies may be used for modifying the wavelet vector in an iterative process to finally obtain a reconstructed signal which best fits the given criterion. In the procedure for effective capacity calculation explained with FIG. 8, in the first step the smallest higher frequency portion is selected, and in subsequent iterations the portion is stepwise increased until the given criterion is met. Another possibility is to use a binary strategy (like in a binary search). In this case, the first vector modification would be made to set the cutoff in the middle of the total range. In the next iteration, the vector modification would be so chosen that the cutoff is in the middle of the previously selected half of the range, and so forth. By this strategy, the final result might be faster approached.

A further possibility is to do an interpretation directly on the coefficients so that an inverse transformation is not required after each iterative step. The process then is: Do one wavelet transformation, interpret and modify the coefficients, and finally do the back transformation to obtain the lower frequency portion.

Further Advantages and Possibilities of Signal Analysis by Wavelet Transformation With different types of wavelet bases, it is possible to drive the speed for the noise detection and separation from the signal. Compared to a Fourier transformation, the wavelet transformation is a lot more adaptive because it removes the high frequencies only at the spots where they appear. By applying weighted filters also the intensity of the noise can be captured. Strong deviation will automatically be counted to the signal and thus will influence the effective capacity.

In addition, wavelets are one of the best tools to analyze self-similar structures because they analyze a signal on different scales. Because high-speed network traffic has manifested self-similar correlation structures, wavelets are highly appropriate in this context.

Selection of Sampling Speed for Traffic Measurements

To enable a signal/noise separation where the noise is absorbed in the buffer, the sampling frequency must be high enough to capture a potential buffer filling between two sampling points. Therefore, the maximum number of cells that arrive in the time between two measurement points must be below the buffer capacity. On the other hand, one wants to obtain more detailed information on the cell arrival process. As a conclusion, the sampling frequency must be a fraction of the buffer size. For a 155 Mbit/s link, a sample about every ms is a good value; this corresponds to a maximum of 365 cells which is about ⅓ of an often used buffer size of 1000 cells.

Changing Utilization Factor when Quality Changes

The queue manager monitors periodically the buffer. In case a certain "high water mark" is reached or even cell losses occur, it signals this fact to the resource manager. The RM then reduces the buffer utilization factor thus making the CAC more "pessimistic" in the sense that the allocation strategy converges to peak rate allocation. A typical multiplication factor is ½.

After a certain period of time has passed without any lost cell, the QM signals this to the RM. The link buffer utilization is then increased. A typical multiplication factor is 1.05 which increases the link utilization by 5%. In general the reduction factor should be more drastic than the increase factor in order to avoid strong oscillation. However, it should be noted that only on high speed links the cell loss rate can be used to drive a CAC algorithm, because only on a high speed link this parameter can be measured with good confidence in a reasonable time interval.

What is claimed is:

1. Method for Connection Admission Control (CAC) in a high-speed packet switched network, in which a request for a new connection or for a bandwidth expansion is accepted or rejected in dependence of a newly required transmission capacity and an already reserved transmission capacity, said method comprising the following steps:

regularly measuring actual traffic rate to produce sequential samples representing a traffic signal, separating, for a window of such samples, in an iterative and adaptive signal transformation operation, a high frequency portion of said traffic signal, and changing, preferably in each iteration, said separated high frequency portion until a given relation between said high frequency portion and available buffer size is satisfied;

determining, in a reverse transform operation, from the remaining low frequency portion of said traffic signal an effective capacity value, and using said effective capacity value as a basis for connection admission control procedure.

2. The method according to claim 1, including the following steps:

maintaining a reserved bandwidth value (r_bw) representing the already reserved transmission capacity, updating said reserved bandwidth value
   a. when a request for a new connection is accepted, by adding the peak traffic rate (R) specified for this new connection to the current reserved bandwidth value, and
   b. when a new effective capacity value (c) becomes available, by deriving the reserved bandwidth value from the new effective capacity value.

3. The method according to claim 2, including the following step:

limiting the resulting new reserved bandwidth value (r_bw) between two given limit values (S_R, S_m).

4. The method according to claim 1, in which said separating and changing step includes the following steps:

preferably in each iteration, accumulating sequential values of the currently separated high frequency portion to obtain a sequence of cumulative sum values (cumsum), and testing whether the maximum value (max_dev) of said sequence of cumulative sum values is beyond a value representing buffer capacity (buffer_util*buffer_size).

5. The method according to claim 1, wherein the signal transformation operation is a wavelet transformation.

6. The method according to claim 1, including the following steps for the separating operation:
   a. transforming a window of samples into a set of coefficients by a wavelet transformation;

b. extracting a subset of said set of coefficients to effect a selective filtering operation for separating a high frequency portion from the traffic signal, retransforming the extracted subset of coefficients into a test window of samples, and comparing a maximum value derived from this test window with a predetermined buffer capacity value to detect whether a given relation is satisfied;

c. depending on the test result, either
   c1. repeating step b by extracting another, modified subset of coefficients, or
   c2. subtracting the contents of the appropriate test window of samples from the original window of samples, to obtain a filtered window of samples representing a low frequency portion of the traffic signal, and d. obtaining a new effective capacity value (c) by setting it equal to the maximum value in this filtered window of samples.

7. The method according to claim 1, in which a new value for the effective capacity (c) is obtained in regular intervals, and sequential values of the effective capacity (c) are obtained for overlapping windows of traffic capacity samples.

8. The method according to claim 1, including the following steps:

watching buffer activity to obtain a quality loss indication when cell losses or buffer overfilling occur, and determining a new value for the effective capacity (c) whenever a quality loss indication is obtained.

9. The method according to claim 2, including the following steps:

obtaining an estimated peak rate value (R) and an estimated mean rate value (m) with each request for a new connection or a bandwidth expansion, accumulating the peak rate values and mean rate values from all accepted connection requests, to obtain an aggregate peak rate value (S_R) and an aggregate mean rate value (S_m), and restricting each new reserved bandwidth value (r_bw) between two limits given by the two aggregate values.

10. The method according to claim 9, including the following steps:

registering the current aggregate peak rate value (S_R) at regular intervals as old aggregate peak rate value (save_S_R), for updating said reserved bandwidth (r_bw) in accordance with step b. of claim 2, setting the reserved bandwidth value to the sum of the new effective capacity value (c) and the old aggregate peak rate value (save_S_R), and then restricting the new reserved bandwidth value between the two limit values.

11. The method according to claim 2, including the following step:

obtaining a buffer output rate control value (out_rate) by adding to each new reserved bandwidth value (r_bw) a given margin value.

12. Apparatus for performing Connection Admission Control (CAC) in a high speed packet switched network, in which a request for a new connection or for a bandwidth expansion is accepted or rejected in dependence of the newly required transmission capacity and the already reserved transmission capacity, said apparatus comprising:

means for regularly measuring an actual traffic rate to produce sequential samples representing a traffic signal, means for separating, for a window of such samples, in an iterative and adaptive signal transformation operation, a high frequency portion of said traffic signal and changing, preferably in each iteration, said separated high frequency portion until a given relation between said separated high frequency portion and available buffer size is satisfied, means for determining, in a reverse transformation operation, from the remaining low frequency portion of said traffic signal an effective capacity value, and means for using said effective capacity value as a basis for connection admission control.

13. The apparatus according to claim 12, including:

means for maintaining a reserved bandwidth value (r_bw) representing the already reserved transmission capacity, and means for updating said reserved bandwidth value
   a. when a request for a new connection is accepted, by adding the peak traffic rate (r) specified for this new connection to the current reserved bandwidth value, and
   b. when a new effective capacity value (c) becomes available, by deriving the reserved bandwidth value from the new effective capacity value.

* * * * *